United States Patent
Chuang et al.

(10) Patent No.: US 7,677,437 B2
(45) Date of Patent: Mar. 16, 2010

(54) METHODS FOR DETERMINING OPERATIONAL SETTINGS AND RELATED DEVICES

(75) Inventors: Cheng-Te Chuang, Hsinchu (TW); Ti-Wen Yuan, Jhubei (TW); Cheng-Che Chen, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 336 days.

(21) Appl. No.: 11/091,166

(22) Filed: Mar. 28, 2005

(65) Prior Publication Data
US 2006/0213966 A1 Sep. 28, 2006

(51) Int. Cl.
*G06F 17/00* (2006.01)
(52) U.S. Cl. ...................... 235/375; 235/435
(58) Field of Classification Search ............ 455/456.1; 370/338; 235/435, 375; 364/705.01
See application file for complete search history.

(56) References Cited

U.S. PATENT DOCUMENTS

| | | | |
|---|---|---|---|
| 5,086,314 A | 2/1992 | Aoki et al. | |
| 5,910,799 A | 6/1999 | Carpenter et al. | |
| 5,969,974 A * | 10/1999 | Vandenbelt et al. | 708/105 |
| 6,801,779 B1 | 10/2004 | Liebenow | |
| 6,909,708 B1 * | 6/2005 | Krishnaswamy et al. | 370/352 |
| 7,069,020 B2 | 6/2006 | Chung | |
| 7,325,147 B2 | 1/2008 | Satoh et al. | |
| 2002/0082022 A1 * | 6/2002 | Johnson | 455/450 |
| 2004/0100932 A1 * | 5/2004 | Shiota et al. | 370/338 |
| 2004/0137913 A1 * | 7/2004 | Masuda | 455/456.1 |
| 2005/0283799 A1 * | 12/2005 | Domegan et al. | 725/38 |
| 2006/0053458 A1 * | 3/2006 | Borseth | 725/100 |
| 2006/0271952 A1 * | 11/2006 | Gurley et al. | 725/33 |
| 2007/0242167 A1 * | 10/2007 | Suzuki | 348/732 |
| 2008/0037490 A1 * | 2/2008 | Hughes et al. | 370/338 |
| 2008/0280588 A1 * | 11/2008 | Roundtree et al. | 455/405 |

FOREIGN PATENT DOCUMENTS

| | | |
|---|---|---|
| CN | 1498014 | 4/2002 |
| CN | 1354589 | 6/2002 |
| CN | 1378759 | 11/2002 |
| CN | 1414812 | 4/2003 |
| CN | 2003134391 | 5/2003 |

OTHER PUBLICATIONS

CN office action mailed Feb. 1, 2008.
"True Reality TV: TVP5160"; http://www.ti.com/newsinewsdetail. asp?scid=04182, Aug. 30, 2004.
English translation of "True Reality TV: TVP5160"; http://www.ti.com/news/newsdetail.asp?scid=04182, Aug. 30, 2004.

* cited by examiner

*Primary Examiner*—Thien M Le
(74) *Attorney, Agent, or Firm*—Thomas, Kayden, Horstemeyer & Risley

(57) ABSTRACT

The present invention relates to a method, applied in a mobile device, for determining operational settings of the device. Country information is retrieved on the device. An operational setting of a function, such as an output signal format, is automatically determined based on the country information.

14 Claims, 6 Drawing Sheets

| TWN | NTSC |
| USA | NTSC |
| CHN | PAL |

800 ns a processing unit 111 and a storage device 112. The
METHODS FOR DETERMINING OPERATIONAL SETTINGS AND RELATED DEVICES

BACKGROUND

The present disclosure relates generally to methods for determining operational settings, and, more particularly to methods for determining operational settings according to country codes, and related devices.

With the convenience of portable devices, such as mobile phones, smart phones, and PDAs, one can easily carry a device when traveling. Some functions on the devices, however, are country based. For example, TV output video signal formats differ by country. In America, Canada, Japan, South Korea, Mexico, Philippines, Taiwan, and others, the video signal format is NTSC (National Television System Committee). In Australia, China, Germany, Hong Kong, Singapore, and others, the video signal format is PAL (Phase Alternation by Line). In France, Egypt, Iran, Vietnam, and others, the video signal format is SECAM (Systeme Electronique Couleur Avec Memoire). If the devices roam from Taiwan to China, the TV output video signal format must be reset to PAL. Conventionally, the reset procedures for functions are performed manually, which is inconvenient and time-consuming.

SUMMARY

Methods for determining operational settings and related devices are provided.

In an exemplary embodiment of a method for determining operational settings, country information is retrieved on a device. An operational setting of a function on the device is determined based on the country information.

Methods for determining operational settings may take the form of program code embodied in a tangible media. When the program code is loaded into and executed by a machine, the machine becomes an apparatus for practicing the disclosed method.

DESCRIPTION OF THE DRAWINGS

The invention will become more fully understood by referring to the following detailed description with reference to the accompanying drawings, wherein.

DESCRIPTION

Methods for determining operational settings and related devices are provided.

Figure 1:
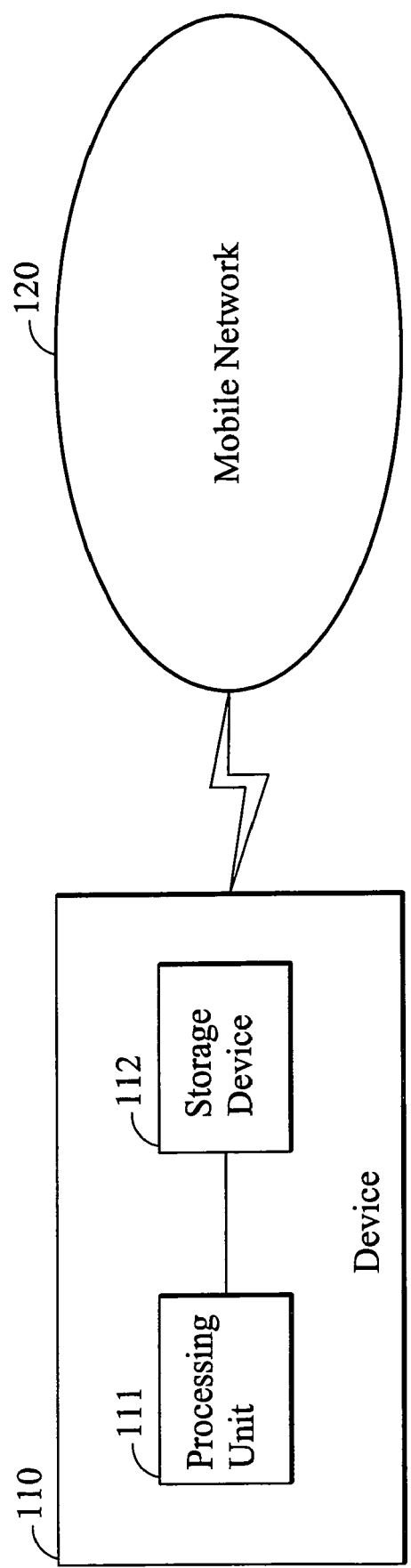
FIG. 1 is a schematic diagram illustrating an embodiment of a device.

FIG. 1 is a schematic diagram illustrating an embodiment of a device. The device 110 may be a portable device, such as a mobile phone, a smart phone, and a PDA. The device 110 comprises a processing unit 111 and a storage device 112. The processing unit 111 performs related operation and related determination of the present invention. The storage device 112 stores operational settings of functions. The operational settings depend on the functions. For example, the operational setting may be TV output video signal format for the TV output function. The operational setting may be system time, exchange rates, and others. The storage device 112 further stores related tables for looking up operational settings for specific functions. The tables will be discussed later. The device 110 communicates with a mobile network 120, such as a telecommunication system. The device 110 receives system information from the mobile network 120, and retrieved country information accordingly. The country information can be stored in the storage device 112.

Figure 2:
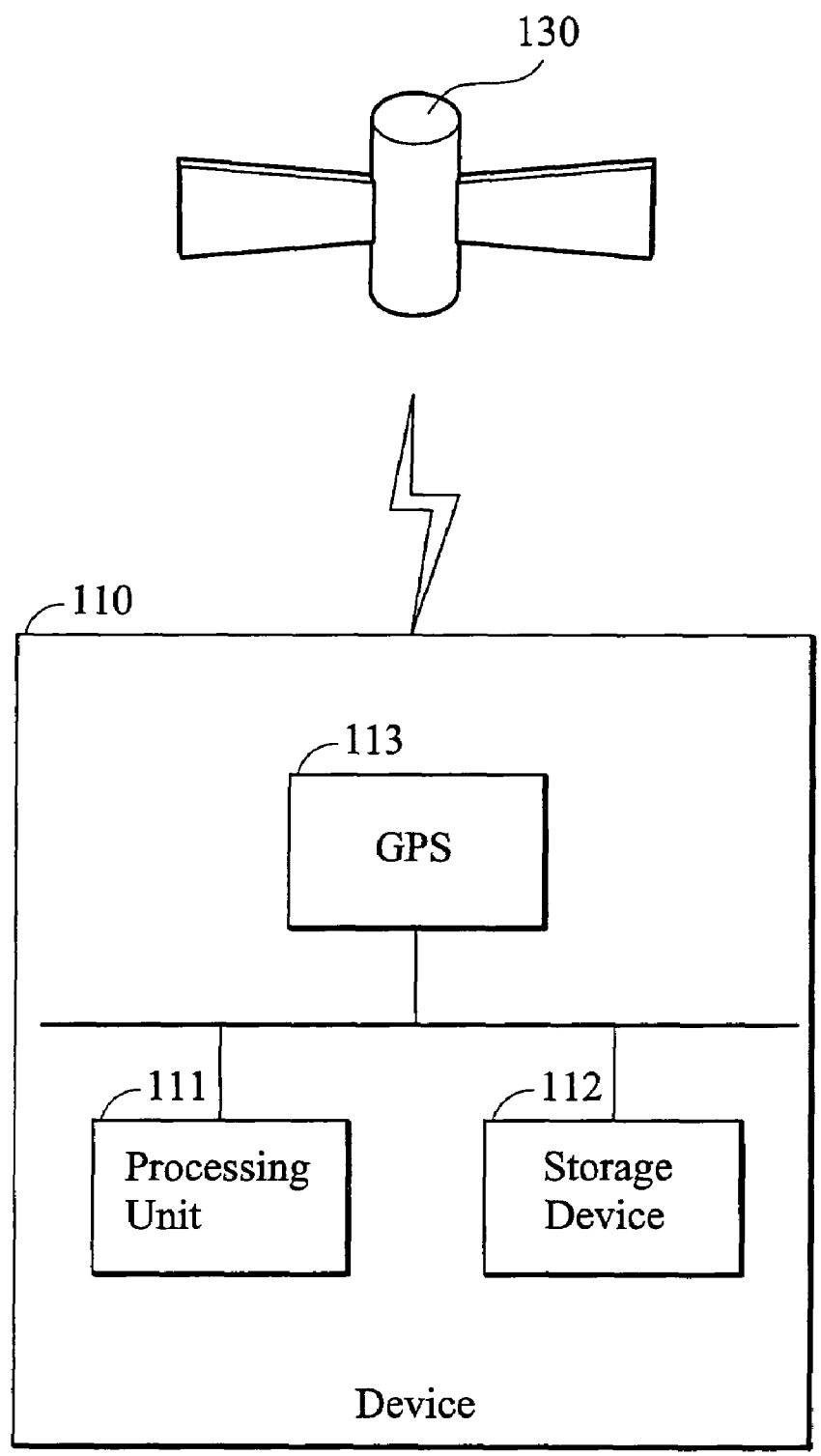
FIG. 2 is a schematic diagram illustrating an embodiment of a device.

FIG. 2 is a schematic diagram illustrating an embodiment of a device. The device 110 may be a portable device, such as a mobile phone, a smart phone, and a PDA. The device 110 comprises a processing unit 111, a storage device 112, and a GPS (Global Positioning System) receiver 113. Similarly, the processing unit 111 performs related operation and determination of the device 110. The storage device 112 stores operational settings of functions and related tables for looking up operational settings for specific functions. The GPS receiver 113 can communicate with a GPS satellite 130, receive signals therefrom, and calculates position information accordingly, such as longitude and latitude of the device 110. The device 110 determines country information according to the position information. The country information can be stored in the storage device 112.

Figure 3:
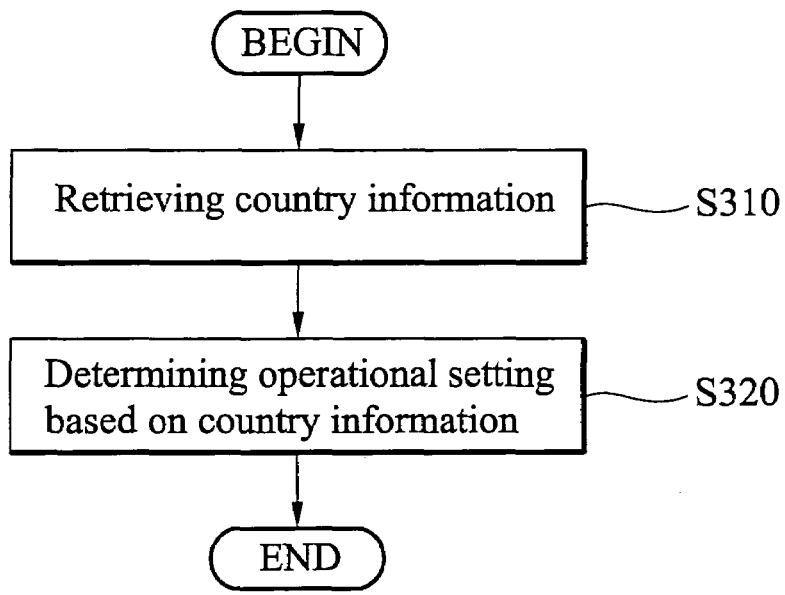
FIG. 3 is a flowchart showing an embodiment of a method for determining operational settings.

FIG. 3 is a flowchart showing an embodiment of a method for determining operational settings. In step S310, country information is retrieved. Then, in step S320, the operational setting of a specific function is determined based on the country information.

Several methods of retrieving country information are provided.

Figure 4:
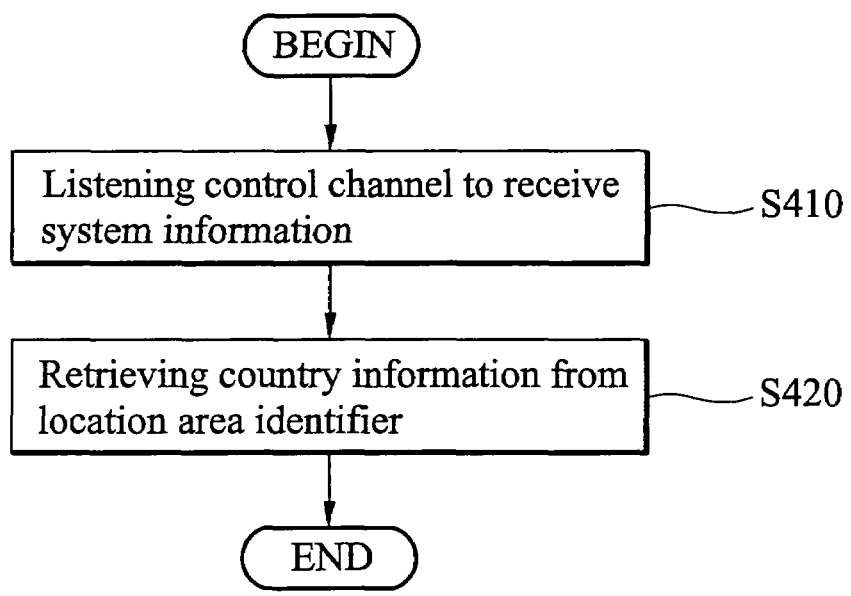
FIG. 4 is a flowchart showing an embodiment of a method for retrieving country information.

FIG. 4 is a flowchart showing an embodiment of a method for retrieving country information. In step S410, the device 110 listens to a broadcast control channel (BCCH) provided by the mobile network 120, and receives system information from the channel. The system information comprises a location area identifier (LAI) comprising a country code, a mobile network code, and a location area code. Then, in step S420, country information, such as the country code in the location area identifier is retrieved from the system information.

Figure 5:
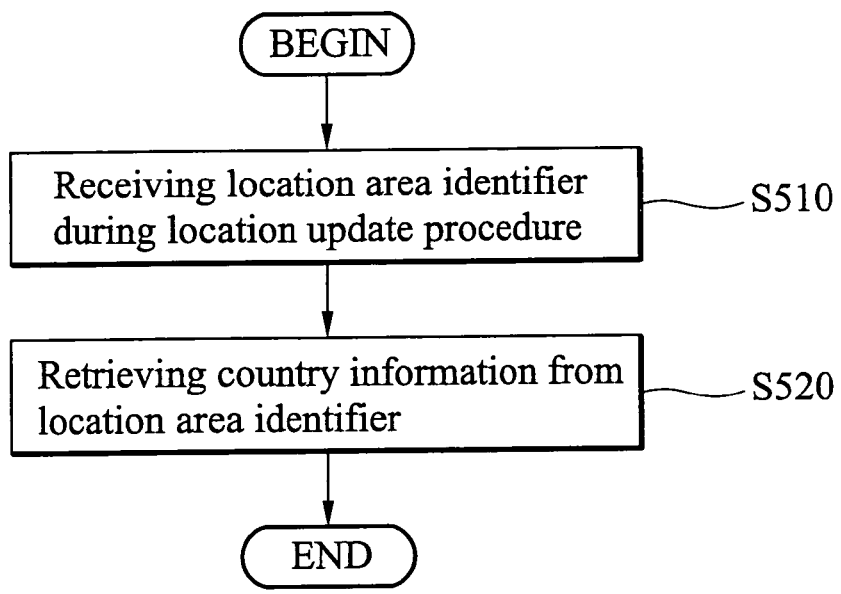
FIG. 5 is a flowchart showing an embodiment of a method for retrieving country information.

FIG. 5 is a flowchart showing an embodiment of a method for retrieving country information. In step S510, the device 110 receives a location area identifier from the mobile network 120 during location update procedures between the device 110 and the mobile network 120. The location update procedures may occur during registration between the device 110 and the mobile network 120, device movement to a new location area, and others. Similarly, the location area identifier comprises a country code, a mobile network code, and a location area code. It is understood that the location area identifier can be also obtained during other procedures, such as PLMN (Public Land Mobile Network) selection after switch-on, normal cell selection, PLMN selection from lack of coverage, manual PLMN search, HPLMN (Home Public Land Mobile Network) search, and others. Then, in step S520, country information, such as the country code is retrieved from the location area identifier.

Figure 6:
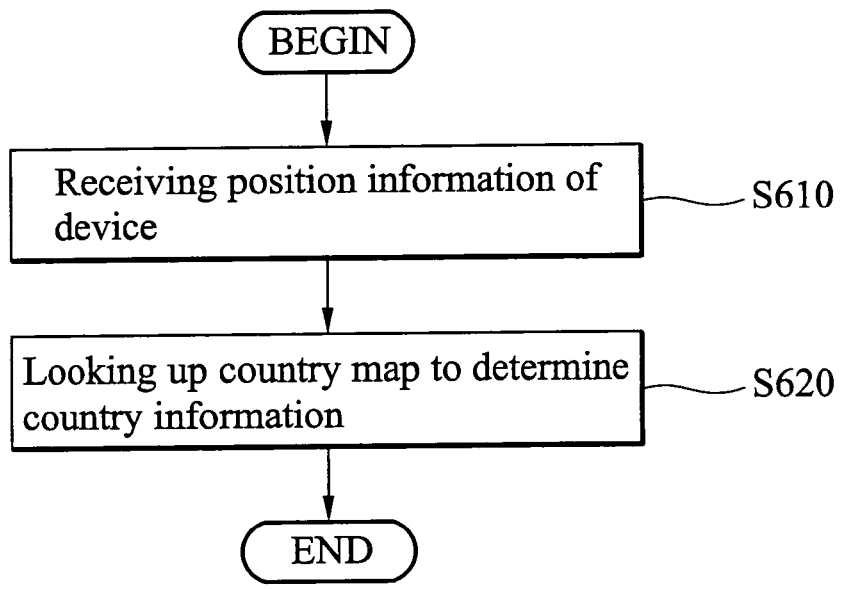
FIG. 6 is a flowchart showing an embodiment of a method for retrieving country information.

FIG. 6 is a flowchart showing an embodiment of a method for retrieving country information. In step S610, the GPS receiver 113 of the device 110 receives signals from the GPS satellite 130. The signals can be used to generate position information, such as longitude and latitude of the device 110. Then, in step S620, a country map (not shown) is looked up to determine country information according to the position information. It is understood that the country map records the contours of respective countries in longitude and latitude.

It is understood that the country information can be set via an interface (not shown) of the device 110 by a user. Furthermore, in some embodiments, after the device obtains the country information, the device can show the obtained country information on the interface for the user to confirm. When the user thinks the obtained country information is incorrect, the user can overwrite and reset the country information via the interface.

Additionally, the country information can be also identified according to city information set via an interface (not shown) of the device 110 by the user. For example, when traveling from one country to another, the user will reset the system time of the device 110 manually by selecting a city from a city list provided in the device 110. The device 110 comprises a first mapping table (not shown) for mapping a specific city to a corresponding time zone, and the device 110 will base on the mapped time zone to set the system time. Also, the device 110 has a second mapping table (not shown) for mapping a specific city to corresponding country information, and the device 110 will base on the city information obtained during the system time setting by the user to look up the second mapping table so as to obtain the country information.

Several examples of operational setting determination for specific functions are provided.

Figures 7, 8:
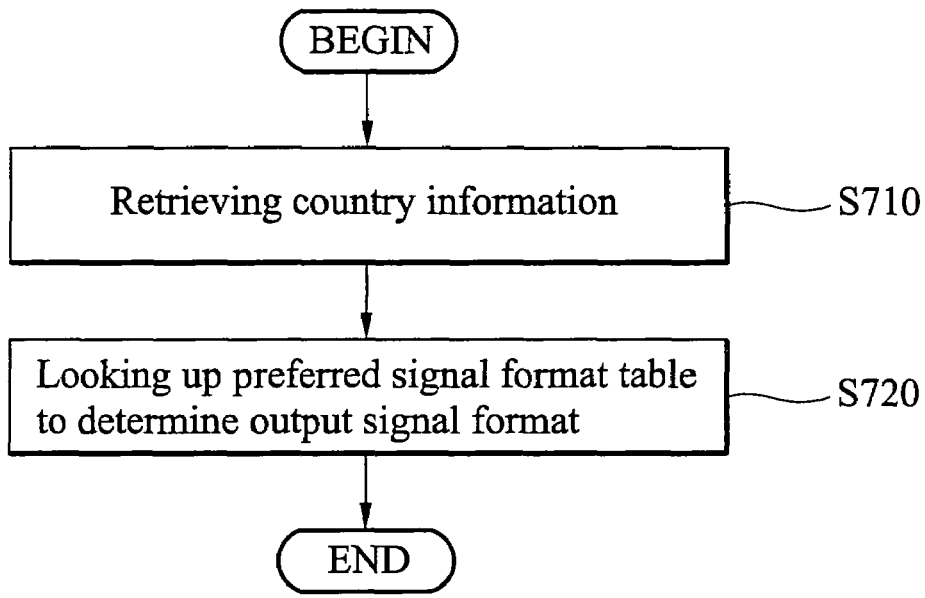
FIG. 7 is a flowchart showing an embodiment of a method for determining output signal format.
FIG. 8 is a schematic diagram illustrating an embodiment of a preferred signal format table.

FIG. 7 is a flowchart showing an embodiment of a method for determining output signal format. In step S710, country information is retrieved. It is understood that the country information can be retrieved according to the location area identifier or the position information of the device 110, and is not limited thereto. In step S720, a preferred signal format table is looked up to determine a specific output signal format according to the country information. FIG. 8 is a schematic diagram illustrating an embodiment of a preferred signal format table 800. The table 800 comprises a plurality of first fields for strong country codes, and a plurality of second fields. Each of the second fields corresponds to a first field for storing TV output video signal format(s) acceptable in the country represented by the corresponding country code. As shown in FIG. 8, the TV output video signal formats for Taiwan (TWN), America (USA) and China (CHN) are NTSC, NTSC and PAL, respectively. If the retrieved country information regards Taiwan, the TV output video signal format is automatically determined to be NTSC. It is understood that if several formats are acceptable in a country, all of the formats may be stored in the preferred signal format table, and the most widely used format can be set as a default format. In some embodiments, the device 110 may show all of the acceptable formats on the interface for user selection.

Figure 9:
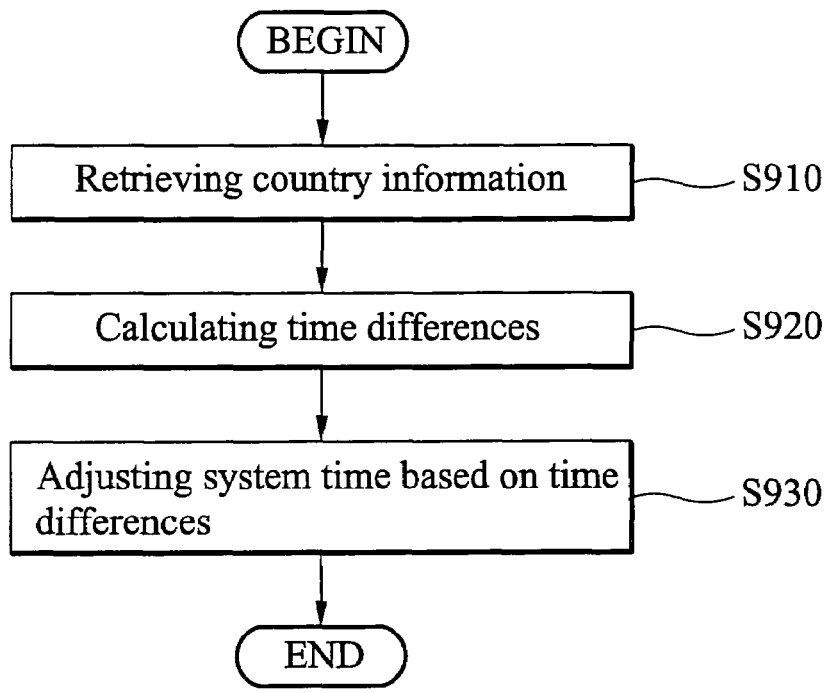
FIG. 9 is a flowchart showing an embodiment of a method for system time adjustment.

FIG. 9 is a flowchart showing an embodiment of a method for system time adjustment. In step S910, country information is retrieved. It is understood that the country information can be retrieved according to the location area identifier or the position information of the device 110, and is not limited thereto. In step S920, time difference is calculated according to the current country corresponding to the retrieved country information and a country that the device 110 previously located. It is understood that the country that the device 110 previously located can be obtained from the storage device 112. Furthermore, the device 110 has a time zone table (not shown). The time zone table comprises a plurality of first fields for storing country codes, and a plurality of second fields. Each of the second fields corresponds to a first field for storing time zone(s) where the country represented by the corresponding country code is located and covers. It is understood that if several time zones are in the current country, a selection of time zones or cities corresponding to time zones can be user provided. By looking up the time zone table, the standard time for the current country and the standard time for the previously located country are obtained so that the time difference between them can be calculated. Then, in step S930, the system time of the device 110 is adjusted based on the time difference between the two countries. For example, if a device roams from Taiwan to Japan, one hour is added to the system time of the device.

Figure 10:
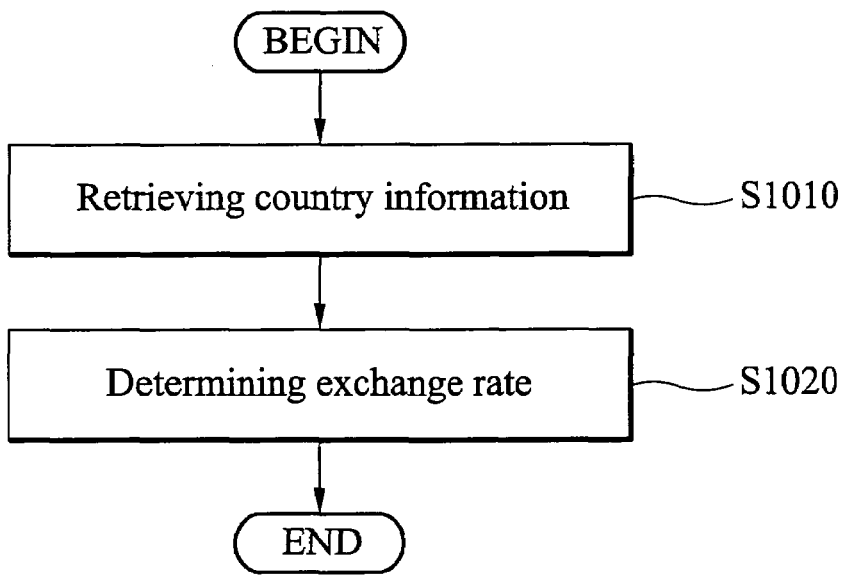
FIG. 10 is a flowchart showing an embodiment of a method for determining exchange rates.

FIG. 10 is a flowchart showing an embodiment of a method for determining exchange rates. In step S1010, country information is retrieved. It is understood that the country information can be retrieved according to the location area identifier or the position information of the device 110, and is not limited thereto. In step S1020, an exchange rate for the current country corresponding to the retrieved country information and a country that the device 110 previously located is determined. It is understood that the country that the device 110 previously located can be obtained from the storage device 112. Furthermore, the device 110 has a currency value table (not shown). The currency value table comprises a plurality of first fields for storing country codes, and a plurality of second fields. Each of the second fields corresponds to a first field for storing the value of circulated currency in the country represented by the corresponding country code. By looking up the currency value table, the values of circulated currency in the current country and that for the previously located country are obtained, so that the exchange rate between the two countries can be calculated. In some embodiments, the information provided in the currency value table can be dynamically updated from the mobile network 120.

Methods for determining operational settings, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for determining operational settings for use in a device, comprising:
   receiving signals, and generating position information of the device accordingly; identifying and retrieving the first country information according to the position information of the device; and
   determining a TV output signal format on the device for a TV output function based on the first country information,
   wherein the first country information is obtained from a connected network while connecting thereto or from a broadcast channel during receiving signals therefrom.

2. The method of claim 1 further comprising:
   listening to a control channel provided by a mobile network, and receiving system information of the mobile network from the control channel, in which the system information comprises a location area identifier; and
   retrieving the first country information from the location area identifier.

3. The method of claim 1 further comprising:
   receiving a location area identifier during a location update procedure between the device and a mobile network; and
   retrieving the first country information from the location area identifier.

4. The method of claim 1 wherein the device is a mobile phone, a smart phone, or a PDA.

5. A device, comprising:
   means for receiving signals, and generating position information of the device accordingly;
   means for identifying and retrieving first country information according to the position information of the device; and
   means for determining a TV output signal format on the device for a TV output function based on the first country information,
   wherein the first country information is obtained from a connected network while connecting thereto or from a broadcast channel during receiving signals therefrom.

6. The device of claim 5 further comprising:
   means for listening to a control channel provided by a mobile network, and receiving system information of the mobile network from the control channel, in which the system information comprises a location area identifier; and
   means for retrieving the first country information from the location area identifier.

7. The device of claim 5 further comprising:
   means for receiving a location area identifier during a location update procedure between the device and a mobile network; and
   means for retrieving the first country information from the location area identifier.

8. The device of claim 5 being a mobile phone, a smart phone, or a PDA.

9. A method for determining operational settings for use in a device, comprising:
   retrieving first country information on the device; and
   determining a TV output signal format on the device for a TV output function based on the first country information,
   wherein the first country information is obtained from a connected network while connecting thereto or from a broadcast channel during receiving signals therefrom and the device is a mobile phone, a smart phone, or a PDA.

10. The method of claim 9 further comprising:
    listening to a control channel provided by a mobile network, and receiving system information of the mobile network from the control channel, in which the system information comprises a location area identifier; and
    retrieving the first country information from the location area identifier.

11. The method of claim 9 further comprising:
    receiving a location area identifier during a location update procedure between the device and a mobile network; and
    retrieving the first country information from the location area identifier.

12. A device, comprising:
    means for retrieving first country information; and
    means for determining a TV output signal format on the device for a TV output function based on the first country information,
    wherein the first country information is obtained from a connected network while connecting thereto or from a broadcast channel during receiving signals therefrom and the device is a mobile phone, a smart phone, or a PDA.

13. The device of claim 12 further comprising:
    means for listening to a control channel provided by a mobile network, and receiving system information of the mobile network from the control channel, in which the system information comprises a location area identifier; and
    means for retrieving the first country information from the location area identifier.

14. The device of claim 12 further comprising:
    means for receiving a location area identifier during a location update procedure between the device and a mobile network; and
    means for retrieving the first country information from the location area identifier.

* * * * *